United States Patent
Takeuchi et al.

(10) Patent No.: US 10,539,344 B2
(45) Date of Patent: Jan. 21, 2020

(54) ADSORBER

(71) Applicant: DENSO CORPORATION, Kariya, Aichi-pref. (JP)

(72) Inventors: Shinsuke Takeuchi, Kariya (JP); Hisao Nagashima, Kariya (JP); Yoshiyuki Okamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 306 days.

(21) Appl. No.: 15/516,295

(22) PCT Filed: Oct. 8, 2015

(86) PCT No.: PCT/JP2015/005107
§ 371 (c)(1),
(2) Date: Mar. 31, 2017

(87) PCT Pub. No.: WO2016/059777
PCT Pub. Date: Apr. 21, 2016

(65) Prior Publication Data
US 2017/0328606 A1    Nov. 16, 2017

(30) Foreign Application Priority Data
Oct. 15, 2014   (JP) .................................. 2014-210756

(51) Int. Cl.
*F25B 17/08* (2006.01)
*F25B 35/04* (2006.01)
*C09K 5/04* (2006.01)

(52) U.S. Cl.
CPC .............. *F25B 17/08* (2013.01); *C09K 5/047* (2013.01); *F25B 35/04* (2013.01)

(58) Field of Classification Search
CPC ........ C09K 5/047; F25B 17/08; F25B 17/086; F25B 35/04; F25B 37/00; Y02B 30/64
See application file for complete search history.

(56) References Cited

U.S. PATENT DOCUMENTS

| | | | | |
|---|---|---|---|---|
| 6,074,972 | A | * | 6/2000 | Bratton .................. B01J 20/183 165/104.15 |
| 2002/0035849 | A1 | * | 3/2002 | Tanaka .................. F25B 17/083 62/480 |

(Continued)

FOREIGN PATENT DOCUMENTS

| | | | |
|---|---|---|---|
| JP | H06 82116 A | | 3/1994 |
| JP | 2002-254925 | * | 9/2002 |

(Continued)

*Primary Examiner* — Henry T Crenshaw
(74) *Attorney, Agent, or Firm* — Harness, Dickey & Pierce, P.L.C.

(57) ABSTRACT

An adsorber includes: a closed container in which an adsorption medium is included; an adsorption part that is provided in the closed container and includes an adsorbent, which adsorbs and desorbs the adsorption medium; and an evaporation/condensation part that is provided in the closed container and that exchanges heat between the adsorption medium and a heat exchanging medium, which is supplied from outside of the closed container, to evaporate and condense the adsorption medium. The evaporation/condensation part includes a heat transfer part that transfers heat of the heat exchanging medium to the adsorption medium. The heat transfer part is capable of holding the adsorption medium, an amount of which is capable of being adsorbed by the adsorbent of the adsorption part.

10 Claims, 12 Drawing Sheets

(56) References Cited

U.S. PATENT DOCUMENTS

| | | | | |
|---|---|---|---|---|
| 2008/0028787 A1* | 2/2008 | Mieda | ............... | F25B 35/04 |
| | | | | 62/480 |
| 2008/0078532 A1* | 4/2008 | Nagashima | ............ | B22F 3/11 |
| | | | | 165/104.34 |
| 2010/0314084 A1* | 12/2010 | Takeuchi | ............ | F25B 37/00 |
| | | | | 165/166 |
| 2012/0099849 A1 | 4/2012 | Onishi et al. | | |
| 2014/0157815 A1* | 6/2014 | Mckay | ............... | F25B 17/00 |
| | | | | 62/324.2 |
| 2014/0283544 A1 | 9/2014 | Hirota et al. | | |
| 2014/0367071 A1* | 12/2014 | Mittelbach | ........... | F25B 35/04 |
| | | | | 165/104.21 |

FOREIGN PATENT DOCUMENTS

| | | | |
|---|---|---|---|
| JP | 2002254925 | A | 9/2002 |
| JP | 2005300129 | A | 10/2005 |
| JP | 2007064573 | A | 3/2007 |
| JP | 20080039223 | A | 2/2008 |
| JP | 2008107075 | A | 5/2008 |
| JP | 2008121912 | A | 5/2008 |
| JP | 2009036429 | A | 2/2009 |
| JP | 2011161944 | A | 8/2011 |
| JP | 2012091596 | A | 5/2012 |
| JP | 2012201198 | A | 10/2012 |
| JP | 2014181863 | A | 9/2014 |
| JP | 2014211290 | A | 11/2014 |

* cited by examiner

ADSORBER

CROSS REFERENCE TO RELATED APPLICATIONS

This application is a U.S. National Phase Application under 35 U.S.C. 371 of International Application No. PCT/JP2015/005107 filed on Oct. 8, 2015 and published in Japanese as WO 2016/059777 A1 on Apr. 21, 2016. This application is based on and claims the benefit of priority from Japanese Patent Application No. 2014-210756 filed on Oct. 15, 2014 and Japanese Patent Application No. 2015-143540 filed on Jul. 20, 2015. The entire disclosures of all of the above applications are incorporated herein by reference.

TECHNICAL FIELD

The present disclosure relates to an adsorber that evaporates an adsorption medium by the use of an operation such that an adsorbent adsorbs the adsorption medium of a vapor phase to thereby exert a refrigeration capacity by a latent heat of evaporation, and in particular is effectively applied to an air conditioner.

BACKGROUND ART

There has been known an adsorber in which an adsorption part filled with an adsorbent, which adsorbs and desorbs an adsorption medium (for example, water), and an evaporation/condensation part (heat exchanger), which exchanges heat between a heating medium supplied from the outside and the adsorption medium to thereby evaporate or condense the adsorption medium, are provided in a closed container which is held in a state nearly close to a vacuum (for example, refer to Patent Document 1). In this kind of adsorber, the adsorption medium of a liquid phase is evaporated by the evaporation/condensation part in the closed container to thereby obtain a refrigeration capacity by a latent heat of evaporation and the adsorption medium, which is evaporated to be brought into a vapor phase, is adsorbed by the adsorbent in the adsorption part to thereby accelerate evaporation, which results in continuously exerting the refrigeration capacity.

PRIOR ART DOCUMENT

Patent Document

Patent Document 1: JP 2007-64573A

The adsorber of Patent Document 1 described above uses a conventional corrugated fin in the evaporation/condensation part and hence cannot directly hold the adsorption medium on a heat transfer surface of the fin. To secure a heat transfer area, the adsorption medium needs to be more than a maximum adsorption capacity which can be adsorbed by the adsorption part. Further, in the evaporation/condensation part of the adsorber, there is a temperature difference (temperature amplitude) between when the heat of air-conditioned air is transferred to the adsorption medium (when the adsorption medium is evaporated) and when the heat of an outdoor heat exchanger is transferred to the adsorption medium (when the adsorption medium is condensed). When the amount of the adsorption medium is large, a heat capacity is increased and hence a coefficient of performance (COP) of an adsorption type refrigerator using the adsorber is reduced.

SUMMARY OF INVENTION

The present disclosure addresses the above issues. Thus, it is an objective of the present disclosure to reduce a heat capacity of an adsorber provided with an adsorbent that adsorbs and desorbs an adsorption medium.

To achieve the objective, an adsorber in an aspect of the present disclosure includes: a closed container in which an adsorption medium is included; an adsorption part that is provided in the closed container and includes an adsorbent, which adsorbs and desorbs the adsorption medium; and an evaporation/condensation part that is provided in the closed container and that exchanges heat between the adsorption medium and a heat exchanging medium, which is supplied from outside of the closed container, to evaporate and condense the adsorption medium. The evaporation/condensation part includes a heat transfer part that transfers heat of the heat exchanging medium to the adsorption medium. The heat transfer part is capable of holding the adsorption medium, an amount of which is capable of being adsorbed by the adsorbent of the adsorption part.

According to this aspect, in the heat transfer part of the evaporation/condensation part, the heat transfer area in which heat is exchanged between the adsorption medium and the heat exchanging medium becomes large and hence the heat exchanging medium can be efficiently evaporated and condensed. In this way, the amount of the adsorption medium in the closed container can be reduced as much as possible and hence a heat capacity of the adsorption medium can be minimized. As a result, when the adsorber is applied to an adsorption type refrigerator, a COP (cooling output/amount of heat required at the time of operation) can be improved.

BRIEF DESCRIPTION OF DRAWINGS

The above and other objects, features, and advantages of the present disclosure will become more apparent from the following detailed description made with reference to the accompanying drawings. In the drawings.

EMBODIMENTS FOR CARRYING OUT INVENTION

First Embodiment

Hereinafter, a first embodiment in which an adsorber of the present disclosure is applied to an adsorption type refrigerator will be described on the basis of FIG. 1 to FIG. 9. In the present embodiment, the adsorber is applied to an adsorption type refrigerator for a vehicle air conditioner.

Figure 1:
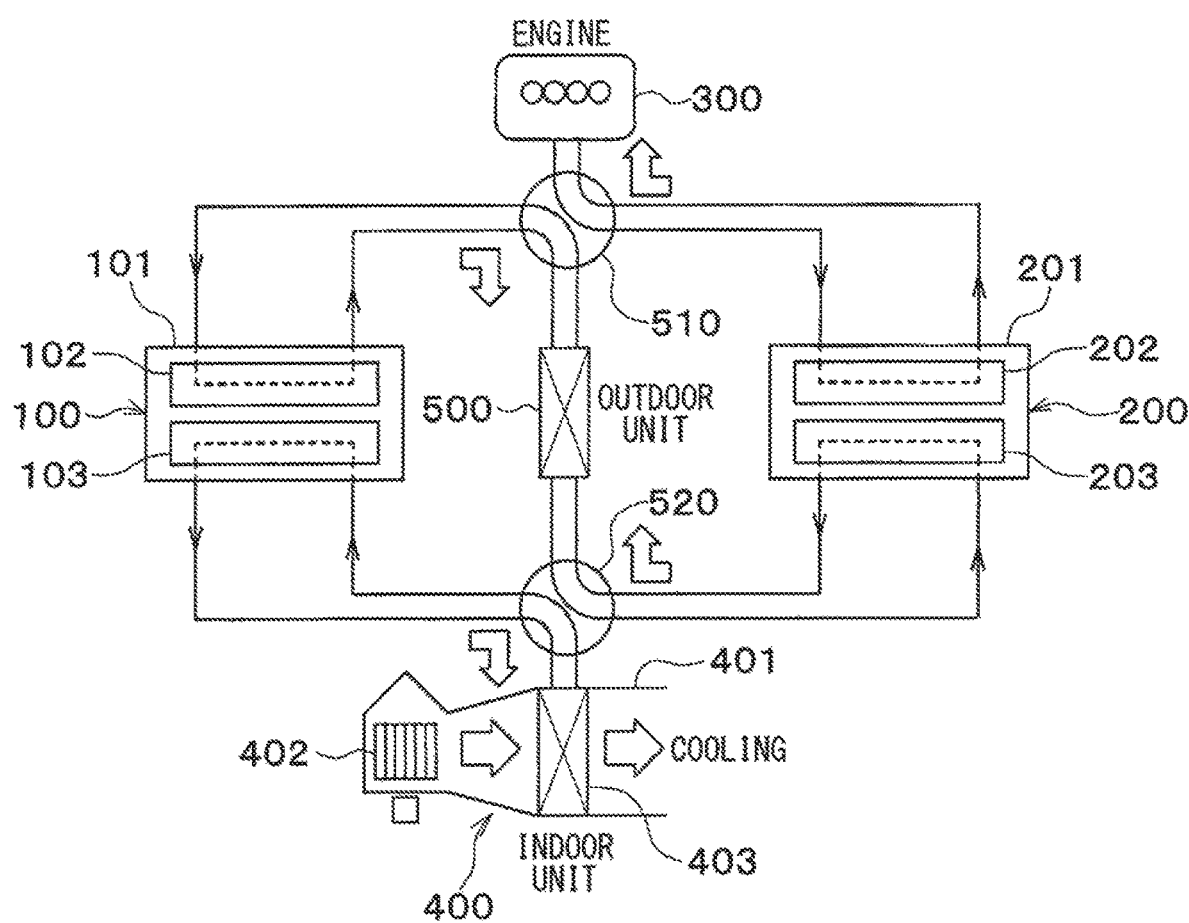
FIG. 1 is a schematic view to show a general construction of an adsorption type refrigerator in a first embodiment.

As shown in FIG. 1, the adsorption type refrigerator is provided with two adsorbers 100, 200. A first adsorber 100 and a second adsorber 200 are constructed in the same way, and when an adsorption operation is performed by one of the first adsorber 100 and the second adsorber 200, a desorption operation is performed by the other of the first adsorber 100 and the second adsorber 200. The construction of each of the first adsorber 100 and the second adsorber 200 will be described later in detail.

A heat exchanging medium is circulated in each of the first adsorber 100 and the second adsorber 200 by an engine 300 for running a vehicle or by a vehicle air conditioner 400. A pump for circulating the heat exchanging medium (not shown in the drawing) is provided in a circulation path of the heat exchanging medium. The engine 300 is a water-cooled internal combustion engine and uses a fluid (engine cooling water), which is made by mixing water with an ethylene glycol-based antifreeze, as the heat exchanging medium for cooling the engine 300.

The vehicle air conditioner 400 is provided with an air-conditioning case 401 to construct a passage for air to be blown off into a vehicle compartment. On an upstream side of an air flow of the air-conditioning case 401 is provided a blower 402 to circulate air in the air-conditioning case 401. On a downstream side of the air flow of the air-conditioning case 401 is provided an indoor heat exchanger 403 to cool the air circulated in the air-conditioning case 401. The indoor heat exchanger 403 acquires a refrigeration capacity from the adsorbers 100, 200 via the heat exchanging medium for air conditioning. In this regard, in the present embodiment, the fluid (which is the same as the engine cooling water), which is made by mixing water with the ethylene glycol-based antifreeze, is used as the heat exchanging medium for air conditioning.

The adsorption type refrigerator of the present embodiment is provided with an outdoor heat exchanger 500 that exchanges heat between the heat exchanging medium flowing out of the adsorbers 100, 200 and an outdoor air to thereby cool the heat exchanging medium. The heat exchanging medium cooled by the outdoor heat exchanger 500 flows into the adsorbers 100, 200.

Further, the adsorption type refrigerator of the present embodiment is provided with two switching valves 510, 520 that switch the circulation path of the heat exchanging medium circulated in the adsorbers 100, 200, respectively. The switching valves 510, 520, the pump to circulate the heat exchanging medium (not shown in the drawing), and the blower 402 have their operations controlled by an electronic control device (not shown in the drawing).

Here, the adsorbers 100, 200 will be described. As described above, the first adsorber 100 and the second adsorber 200 are constructed in the same way, so only a construction of the first adsorber 100 will be described.

Figure 2:
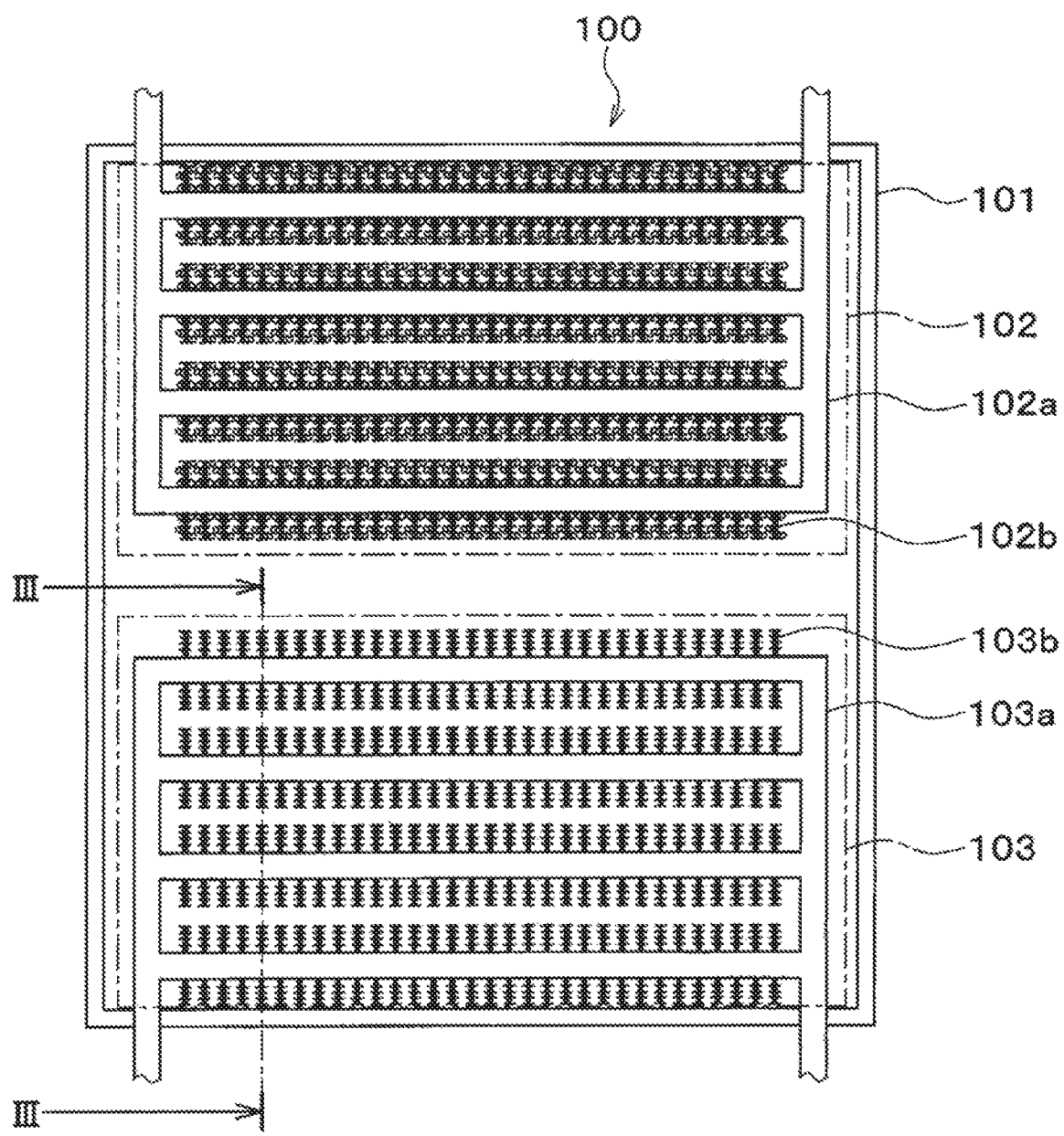
FIG. 2 is a schematic view to show a general construction of an adsorber in the first embodiment.

As shown in FIG. 2, the adsorber 100 is provided with a closed container 101, an adsorption part 102 and an evaporation/condensation part 103, which are provided in the closed container 101. The closed container 101 has an airtight structure and has its interior held in a nearly vacuum state. The closed container 101 has an adsorption medium (refrigerant) included therein. In the present embodiment, water is used as the adsorption medium.

The adsorption part 102 and the evaporation/condensation part 103 of the present embodiment are constructed in nearly the same way and are provided with pipes 102a, 103a, in which the heat exchanging medium flows, and heat transfer parts 102b, 103b, which accelerate a heat exchange between the heat exchanging medium and the adsorption medium, respectively. Each of the heat transfer parts 102b, 103b constructs fins.

Figure 3:
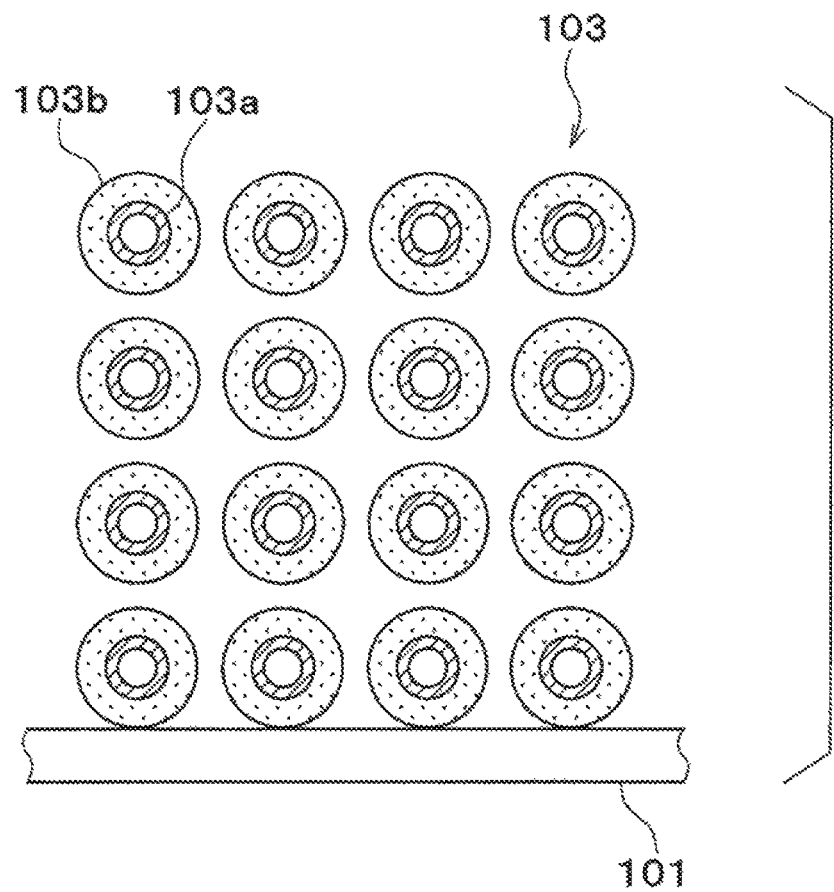
FIG. 3 is a section view taken on a line III-III of FIG. 2.
Figure 4:
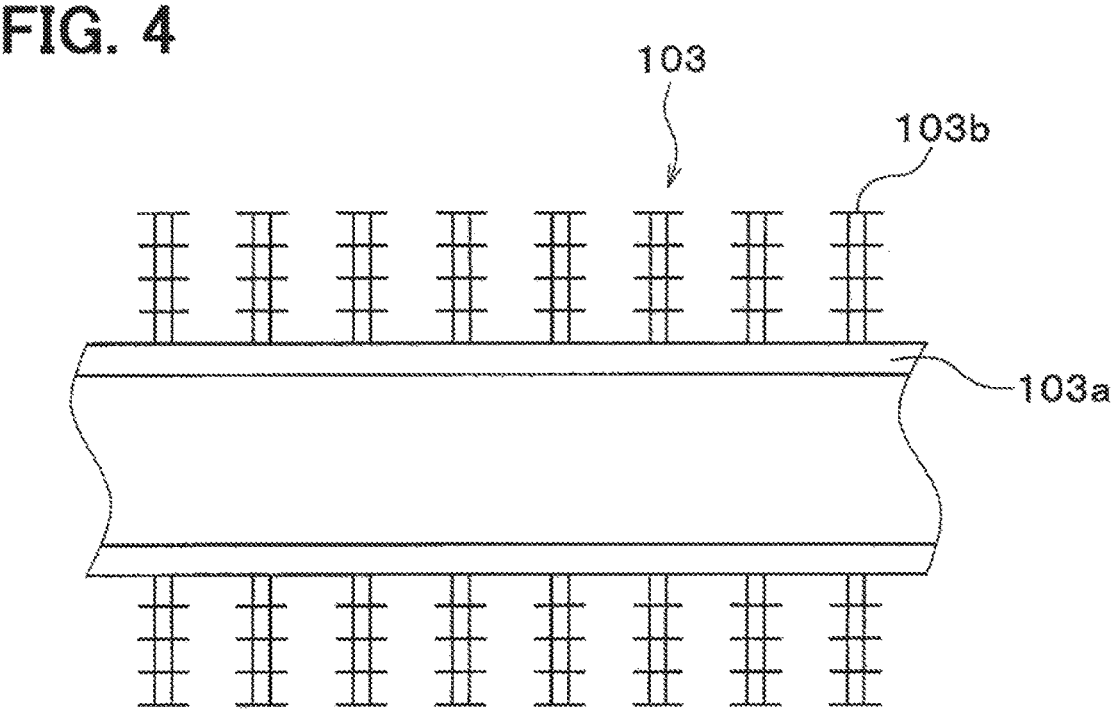
FIG. 4 is a schematic view to enlarge a part of an evaporation/condensation part in the first embodiment.

As shown in FIG. 3, the evaporation/condensation part 103 of the present embodiment is provided with 16 pipes 103a. Each of the pipe 103a is constructed of metal having an excellent thermal conductivity (in the present embodiment, copper or copper alloy). As shown in FIG. 3 and FIG. 4, the heat transfer part 103b is provided on an outer peripheral surface of the cylindrical pipe 103a. The heat transfer part 103b has an enlarged heat transfer surface on which the adsorption medium is directly held and in which a heat transfer area to exchange heat between the adsorption medium and the heat exchanging medium flowing in the pipe 103a is made large as much as possible.

Figure 5:
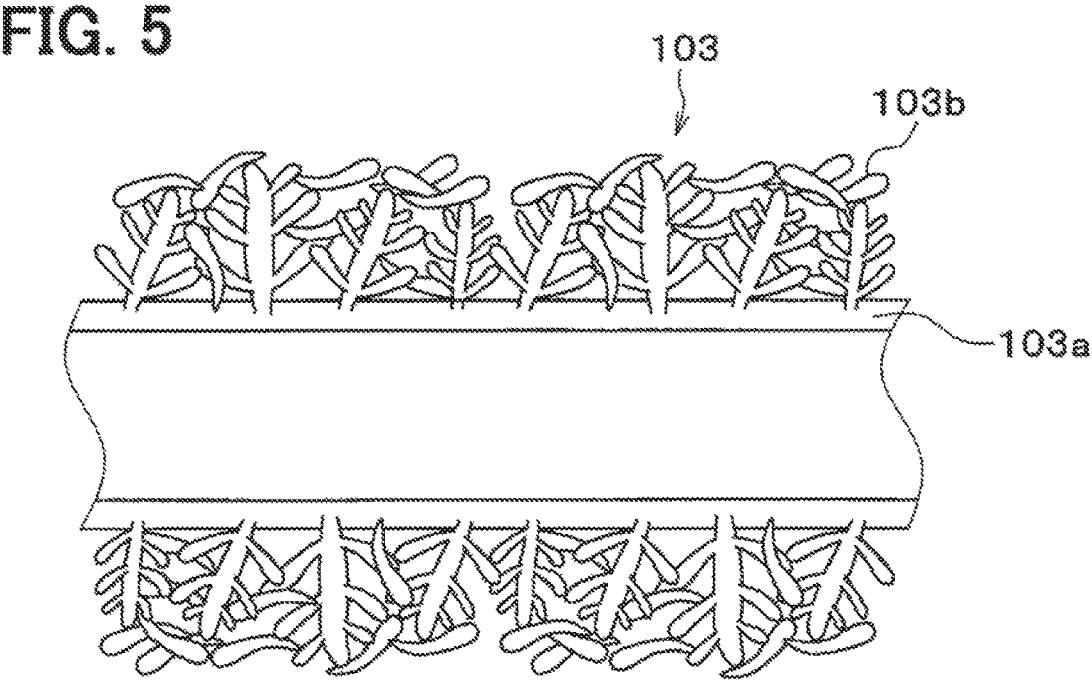
FIG. 5 is a schematic view to show a specific example of the evaporation/condensation part in the first embodiment.

As shown in FIG. 5, the heat transfer part 103b of the present embodiment is constructed of a sintered metal. The sintered metal is made by heating a metal powder or a metal fiber, which has an excellent thermal conductivity, and by bonding the metal powder or the metal fiber without melting them. As the metal powder or the metal fiber, copper or copper alloy can be used. The metal powder can be made in the shape of powder, particle, dendrite, scale, or fiber.

The heat transfer part 103b constructed in this manner becomes a porous heat transfer body having a high porosity and can hold the adsorption medium directly on an uneven surface thereof. For this reason, the heat transfer part 103b can have the heat transfer area, which exchanges heat between the adsorption medium and the heat exchanging medium, made as large as possible and hence can efficiently evaporate and condense the heat exchanging medium.

Further, as shown in FIG. 3, in the evaporation/condensation part 103 of the adsorber 100, the heat transfer part 103b formed in the pipe 103a arranged lowermost in a vertical direction is in contact with a bottom surface of the closed container 101. In other words, a portion of the heat transfer part 103b of the evaporation/condensation part 103 is in contact with the bottom surface of the closed container 101. For this reason, when the adsorption medium of a liquid phase condensed in the closed container 101 is moved down by gravity, the adsorption medium gathered on the bottom surface of the closed container 101 results in being held by the heat transfer part 103b which is in contact with the bottom surface of the closed container 101.

The adsorption part 102 is provided with the pipe 102a and the heat transfer part 102b, which are constructed in the same way as the evaporation/condensation part 103, and also the heat transfer part 102b of the adsorption part 102 is constructed of the sintered metal. The heat transfer part 102b of the adsorber 102 holds an adsorbent to adsorb the adsorption medium. When the adsorbent is cooled, the adsorbent adsorbs the adsorption medium in a state of a vapor phase (water vapor), while when the adsorbent is heated, the adsorbent desorbs the adsorption medium (water vapor) which is adsorbed. The adsorbent is formed in the shape of many fine particles and is constructed of, for example, silica gel or zeolite.

It is sufficient that an amount of the adsorption medium which can be held by the heat transfer part 103b of the evaporation/condensation part is not more than a maximum adsorption capacity of the adsorption medium which can be adsorbed by the adsorbent of the adsorption part 102. This will be described on the basis of FIG. 6.

Figure 6:
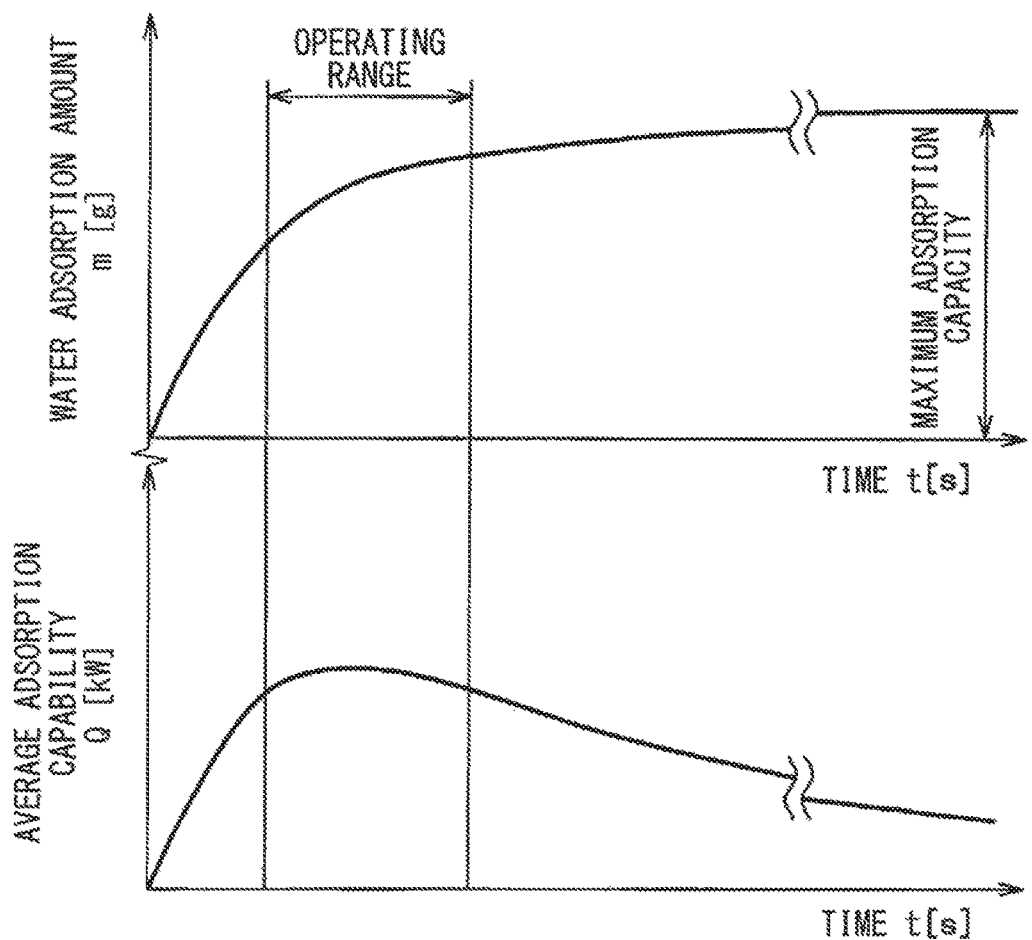
FIG. 6 is a characteristic graph to show a change in an amount of adsorption and an average adsorption capability of an adsorbent with respect to an elapsed time in the first embodiment.

As shown in an upper place of FIG. 6, immediately after the adsorption medium starts to be adsorbed by the adsorbent of the adsorption part 102, an adsorption rate becomes high, and as time passes after the adsorption starts, the adsorption rate becomes slower. The maximum adsorption capacity shown in FIG. 6 is a maximum value of the adsorption medium which can be adsorbed by the adsorption part 102 and is determined according to a kind of the adsorbent and a weight of the adsorbent. Further, an average adsorption capability Q can be found by a mathematical formula of $Q=(\Delta HL \cdot m)/t$.

Here, $\Delta HL$ is a latent heat of the adsorption medium, m is an amount of adsorption of the adsorption medium, and t is an elapsed time from the start of the adsorption.

As shown in a lower place of FIG. 6, the average adsorption capability Q of the adsorption part 102 becomes maximum after a predetermined time passes from the start of adsorption and thereafter gradually becomes smaller. For this reason, an operating range of the adsorption part 102 may be made a range in which the average adsorption capability Q becomes as high as possible, and the adsorption and the desorption of the adsorption medium may be switched in this range. In the range in which the average adsorption capability Q of the adsorption part 102 becomes as high as possible, the amount of adsorption of the adsorption medium in the adsorption part 102 becomes smaller than the maximum adsorption capacity.

Hence, the amount of the adsorption medium held by the heat transfer part 103b of the evaporation/condensation part 103 is recommended to be not more than the maximum adsorption capacity of the adsorption part 102. For this reason, it is sufficient that the heat transfer part 103 can hold the adsorption medium of a necessary amount which is set not more than the maximum adsorption capacity of the adsorption part 102.

Next, an operation of the adsorption type refrigerator having the construction described above will be described. First, the pump (not shown in the drawing) and the blower 402 are operated, thereby making the heat exchanging medium flow in the indoor heat exchanger 403 and making the air flow in the air-conditioning case 401. Then, the switching valves 510, 520 are operated to thereby bring about a state shown in FIG. 1.

In the state shown in FIG. 1, by the first switching valve 510, the heat exchanging medium is circulated in the adsorption part 102 of the first adsorber 100 from the outdoor heat exchanger 500 and the heat exchanging medium is circulated in the adsorption part 202 of the second adsorber 200 from the vehicle engine 300. Further, by the second switching valve 520, the heat exchanging medium is circulated in the evaporation/condensation part 103 of the first adsorber 100 from the indoor heat exchanger 403 and the heat exchanging medium is circulated in the evaporation/condensation part 203 of the second adsorber 200 from the outdoor heat exchanger 500. At this time, the adsorption medium is adsorbed by the adsorption part 102 of the first adsorber 100, and the adsorption medium is desorbed by the adsorption part 202 of the second adsorber 200.

Figure 7A:
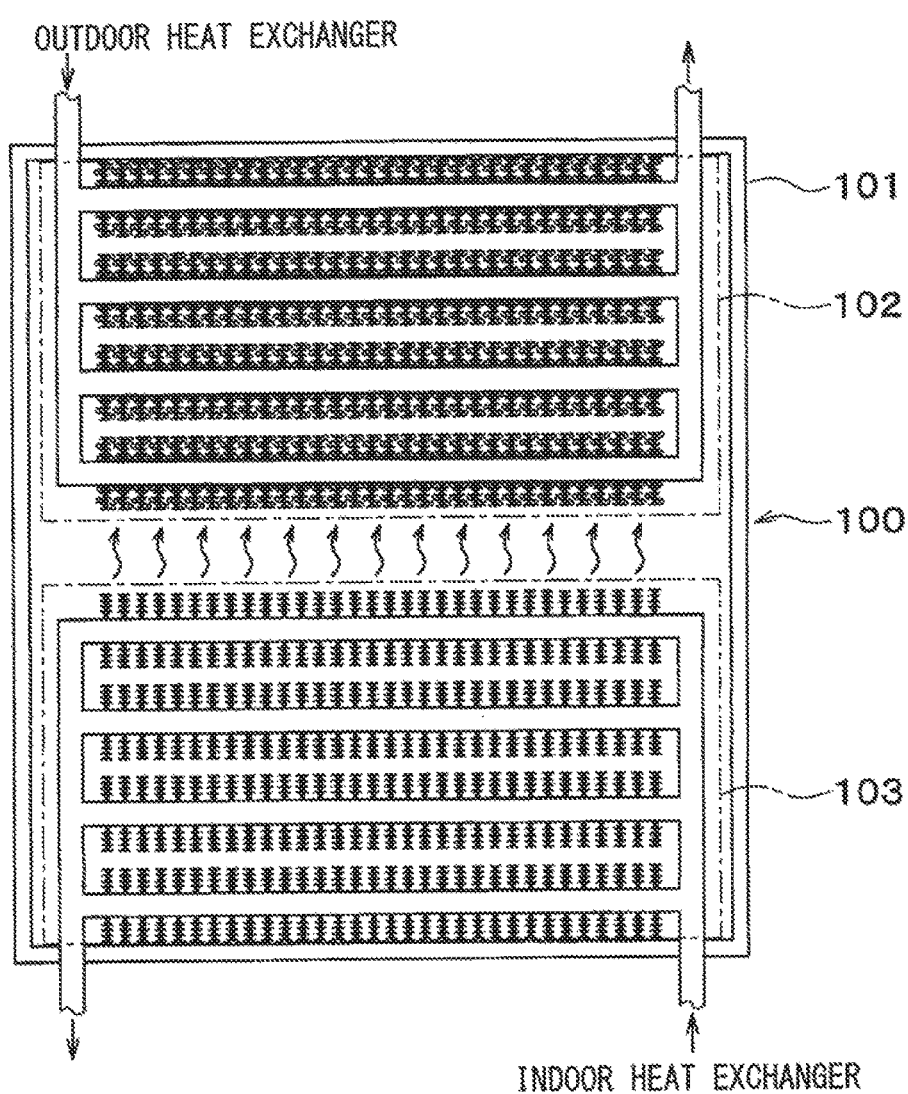
FIG. 7A is a schematic view showing a state where an adsorption medium is evaporated and adsorbed in the adsorber, and showing a state where the adsorption medium is evaporated in the first embodiment.
Figure 7B:
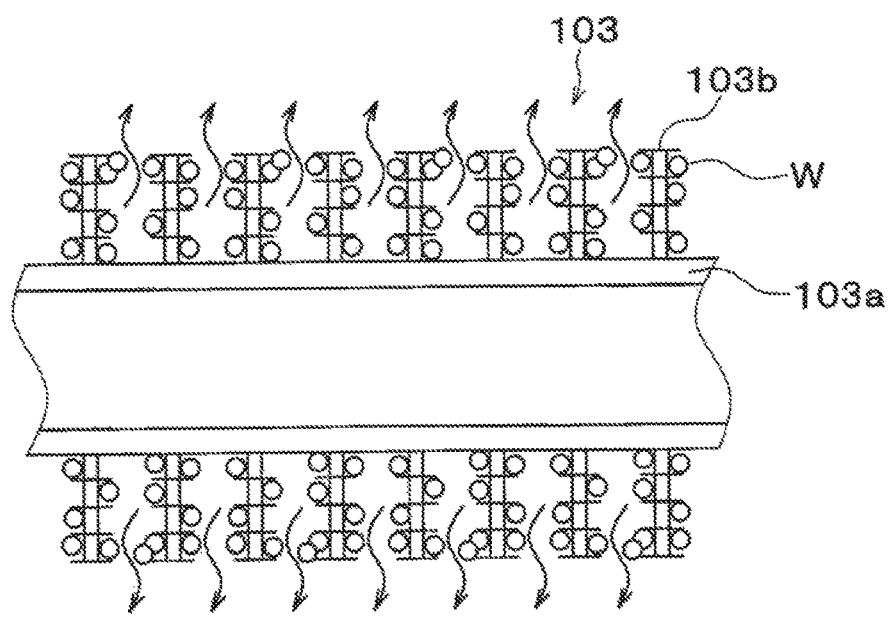
FIG. 7B is a schematic view showing a state where an adsorption medium is evaporated and adsorbed in the adsorber and showing a state where heat is exchanged between the adsorption medium and a heat exchanging medium in the first embodiment.

As shown in FIG. 7A, the heat exchanging medium after cooling an air-conditioned air by the indoor heat exchanger 403 flows into the evaporation/condensation part 103 of the first adsorber 100 and the adsorption medium W of the liquid phase is evaporated by the heat of the heat exchanging medium. At this time, as shown in FIG. 7B, the adsorption medium W of the liquid phase is held on the surface of the heat transfer part 103b of the evaporation/condensation part 103 and a heat exchange between the adsorption medium and the heat exchanging medium flowing in the pipe 103a is accelerated via the heat transfer part 103b having the enlarged heat transfer area, whereby the adsorption medium is efficiently evaporated. In the evaporation/condensation part 103, the heat exchanging medium is cooled by a latent heat of evaporation of the adsorption medium W and the cooled heat exchanging medium flows into the indoor heat exchanger 403, whereby the air-conditioned air blown off into the vehicle compartment is cooled.

The adsorption part 102 of the first adsorber 100 adsorbs the adsorption medium of a vapor phase, which is evaporated by the evaporation/condensation part 103, thereby accelerating the evaporation of the adsorption medium in the evaporation/condensation part 103. When the adsorption part 102 adsorbs the adsorption medium of the vapor phase, the adsorption part 102 generates heat. When the temperature of the adsorption part 102 is increased, an adsorption capability of moisture by the adsorbent is reduced, so that the heat "exchanging medium is circulated between the outdoor heat exchanger 500 and the adsorption part 102 to thereby inhibit a temperature increase of the adsorption part 102.

Figure 8A:
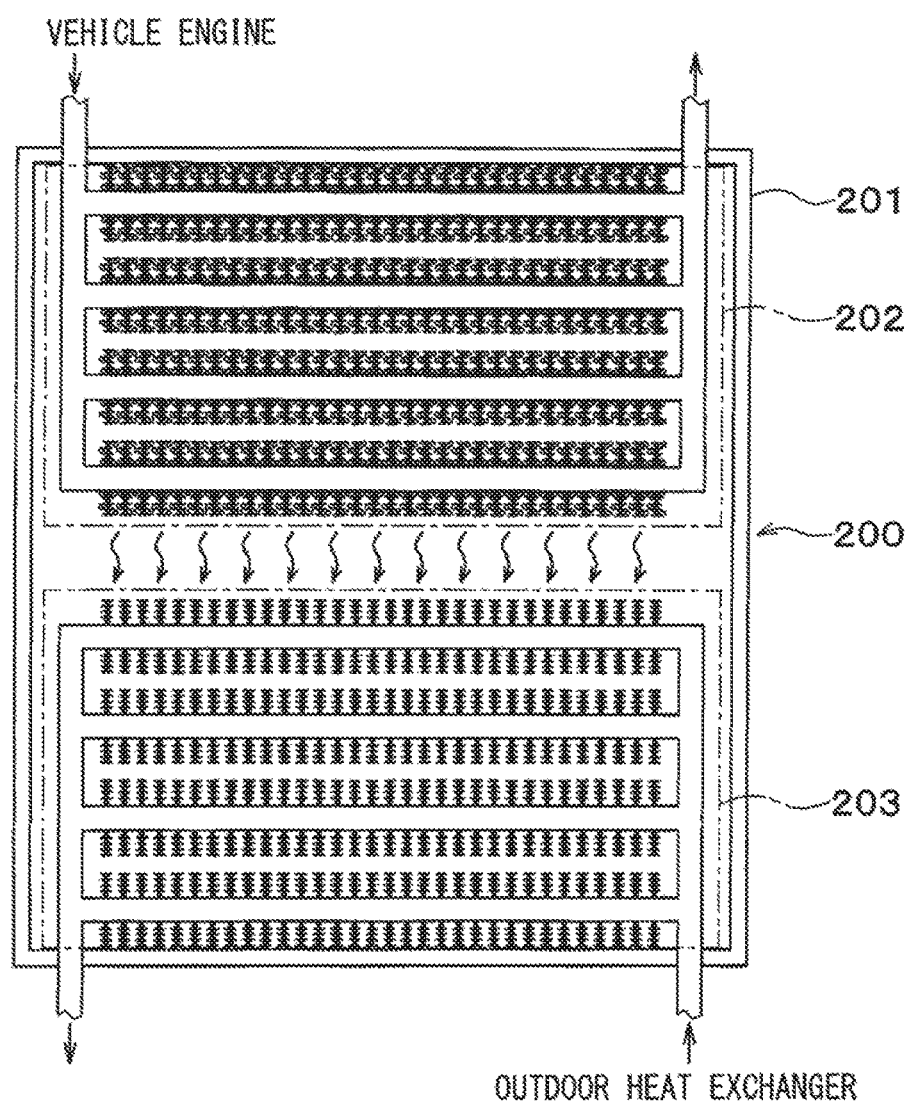
FIG. 8A is a schematic view showing a state where the adsorption medium is desorbed and condensed in the adsorber and showing a state where the adsorption medium desorbed from the adsorption part is condensed in the first embodiment.
Figure 8B:
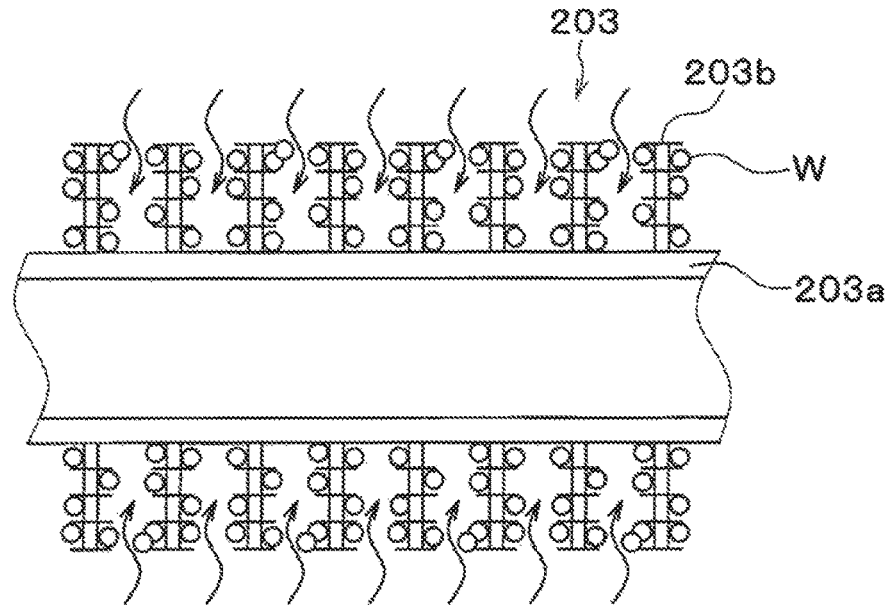
FIG. 8B is a schematic view showing a state where the adsorption medium is desorbed and condensed in the adsorber and showing a state where the adsorption medium is held on a surface of a heat transfer part in the first embodiment.

As shown in FIG. 8A, the heat exchanging medium flows into the adsorption part 202 of the second adsorber 200 from the vehicle engine 300, and in the adsorption part 202, the adsorption medium is heated by the heat of the heat exchanging medium. In this way, the adsorption medium adsorbed by the adsorption part 202 is desorbed from the adsorption part 202. In the evaporation/condensation part 203 of the second adsorber 200, the adsorption medium (water vapor) of the vapor phase, which is desorbed from the adsorption part 202, is cooled and condensed. At this time, a heat exchange between the adsorption medium and the heat exchanging medium flowing in the pipe 203a is accelerated via the heat transfer part 203b having the enlarged heat transfer surface, whereby the adsorption medium is efficiently condensed. As shown in FIG. 8B, the adsorption medium W, which is condensed, is held on the surface of the heat transfer part 203b of the evaporation/condensation part 203.

As described above, in the state shown in FIG. 1, in the first adsorber 100, the adsorption medium is evaporated and the adsorption medium of the vapor phase, which is evaporated, is adsorbed, whereas in the second adsorber 200, the adsorption medium, which is adsorbed, is desorbed and the adsorption medium of the vapor phase, which is desorbed, is cooled and condensed. Hence, the evaporation/condensation part 103 of the first adsorber 100 functions as an evaporator to evaporate the adsorption medium of the liquid phase, whereas the evaporation/condensation part 203 of the second adsorber 200 functions as a condenser to condense the adsorption medium of the vapor phase.

Figure 9:
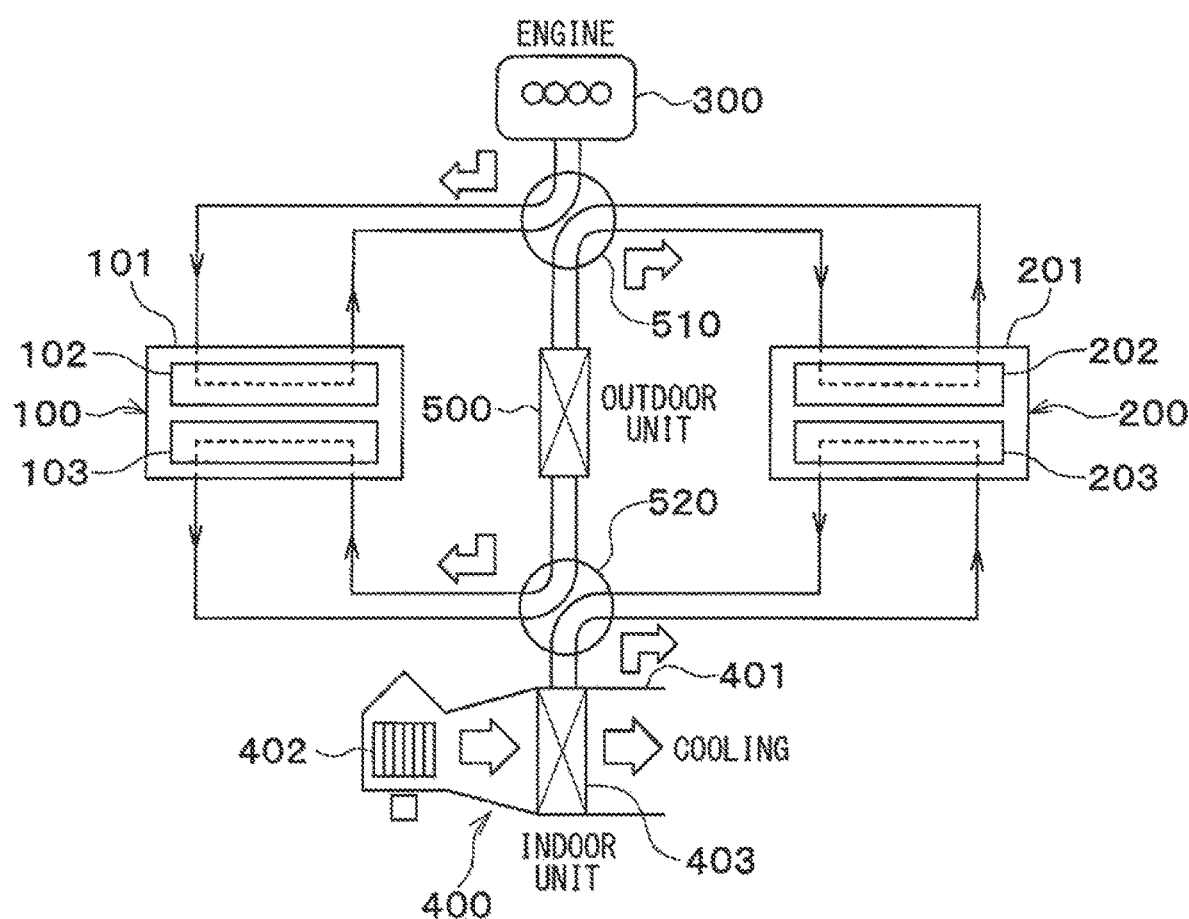
FIG. 9 is a schematic view to show a state where a switching valve of the adsorption type refrigerator in the first embodiment is operated to thereby switch a flow passage of the heat exchanging medium from a state shown in FIG. 1.

Next, when a predetermined time passes after the operation in the state shown in FIG. 1 starts, the switching valves 510, 520 are operated to switch the state shown in FIG. 1 to a state shown in FIG. 9.

In the state shown in FIG. 9, by the first switching valve 510, the heat exchanging medium is circulated in the adsorption part 102 of the first adsorber 100 from the vehicle engine 300 and the heat exchanging medium is circulated in the adsorption part 202 of the second adsorber 200 from the outdoor heat exchanger 500. Further, by the second switching valve 520, the heat exchanging medium is circulated in the evaporation/condensation part 103 of the first adsorber 100 from the outdoor heat exchanger 500 and the heat exchanging medium is circulated in the evaporation/condensation part 203 of the second adsorber 200 from the indoor heat exchanger 403.

In this way, by switching a flow passage of the heat exchanging medium from the state shown in FIG. 1 to the state shown in FIG. 9, an adsorption operation and a desorption operation in two adsorbers 100, 200 can be switched. In other words, in the state shown in FIG. 9, in the first adsorber 100, the adsorption medium which is adsorbed is desorbed and the adsorption medium of the vapor phase which is desorbed is evaporated, whereas in the second adsorber 200, the adsorption medium is evaporated and the adsorption medium of the vapor phase which is evaporated is adsorbed. Hence, the evaporation/condensation part 103 of the first adsorber 100 functions as a condenser to condense the adsorption medium of the vapor phase, whereas the evaporation/condensation part 203 of the second adsorber 200 functions as an evaporator to evaporate the adsorption medium of the liquid phase.

Thereafter, every time a predetermined time passes, the switching valves 510, 520 are switched to alternately switch the state shown in FIG. 1 and the state shown in FIG. 9, whereby the adsorption type refrigerator is continuously operated. In this regard, the predetermined time in which the state shown in FIG. 1 and the state shown in FIG. 9 are switched is selected on the basis of the average adsorption capability Q of the adsorbent which is shown in FIG. 6.

According to the present embodiment described above, in each of the evaporation/condensation parts 103, 203 of the adsorbers 100, 200, each of the heat transfer parts 103b, 203b is constructed of the porous heat transfer body having a high porosity and hence can directly hold the adsorption medium of the liquid phase on its uneven surface. In each of the heat transfer parts 103b, 203b of the evaporation/condensation parts 103, 203, the heat transfer area in which heat is exchanged between the adsorption medium and the heat exchanging medium becomes large, whereby the heat exchanging medium can be efficiently evaporated and condensed. In this way, the amount of the adsorption medium in each of the closed containers 101, 201 can be reduced as much as possible and a heat capacity of the adsorption medium can be minimized, which can hence improve a COP (cooling output/amount of heat required at the time of operation) of the adsorption type refrigerator using the adsorbers 100, 200.

Further, in the present embodiment, the amount of the adsorption medium which can be held by the heat transfer part 103b of the evaporation/condensation part 103 is made not more than the maximum adsorption capacity of the adsorption part 102. In this way, the adsorption parts 102, 202 can be operated in range in which the average adsorption capability Q of the adsorption parts 102, 202 can be made as large as possible and hence the adsorbers 102, 202 can be improved in efficiency.

Further, in the adsorbers 100, 200 of the present embodiment, the evaporation/condensation parts 103, 203 and the adsorption parts 102, 202 are constructed in the same manner except that: the adsorption parts 102, 202 holds the adsorbent; but the evaporation/condensation parts 103, 203 do not hold the adsorbent. In this way, a manufacturing process of the evaporation/condensation parts 103, 203 and a manufacturing process of the adsorbers 102, 202 can be made common, so that a manufacturing process of the adsorbers 100, 200 can be made simple and hence a manufacturing cost of the adsorbers 100, 200 can be reduced.

Still further, in the present embodiment, each of the evaporation/condensation parts 103, 203 of the adsorbers 100, 200 is made to be in contact with the bottom surface of each of the closed containers 101, 201. Even if the adsorption medium of the liquid phase, which is condensed in each of the heat transfer parts 103b, 203b is moved down by the gravity, the adsorption medium gathered on the bottom surface of each of the closed containers 101, 201 can be held by each of the heat transfer parts 103b, 203b arranged at the lowermost position in the vertical direction. As a result, when the adsorption medium is evaporated in each of the evaporation/condensation parts 103, 203, it is possible to prevent a state (dryout) in which the adsorption medium of the liquid phase is not around each of the heat transfer parts 103b, 203b.

Second Embodiment

Next, a second embodiment will be described. In the second embodiment, the description of the same parts as in the first embodiment will be omitted and only different parts will be described.

Figure 10:
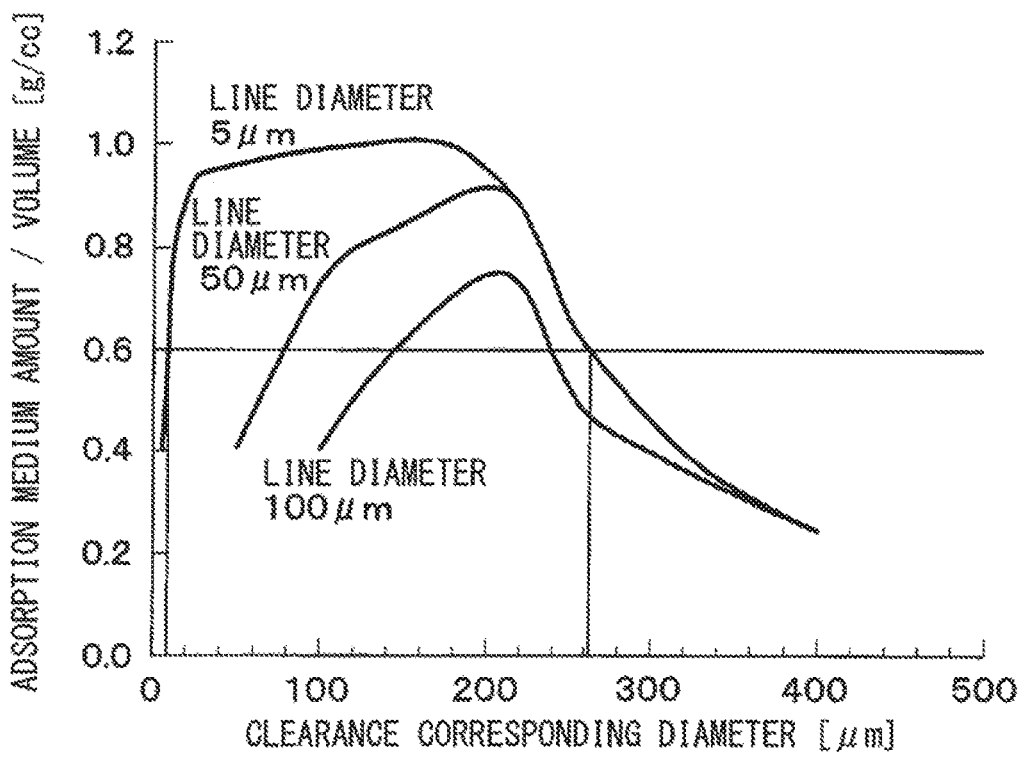
FIG. 10 is a graph to show a relationship between a clearance corresponding diameter and an adsorption medium amount in a heat transfer part of an evaporation/condensation part in a second embodiment.
Figure 11:
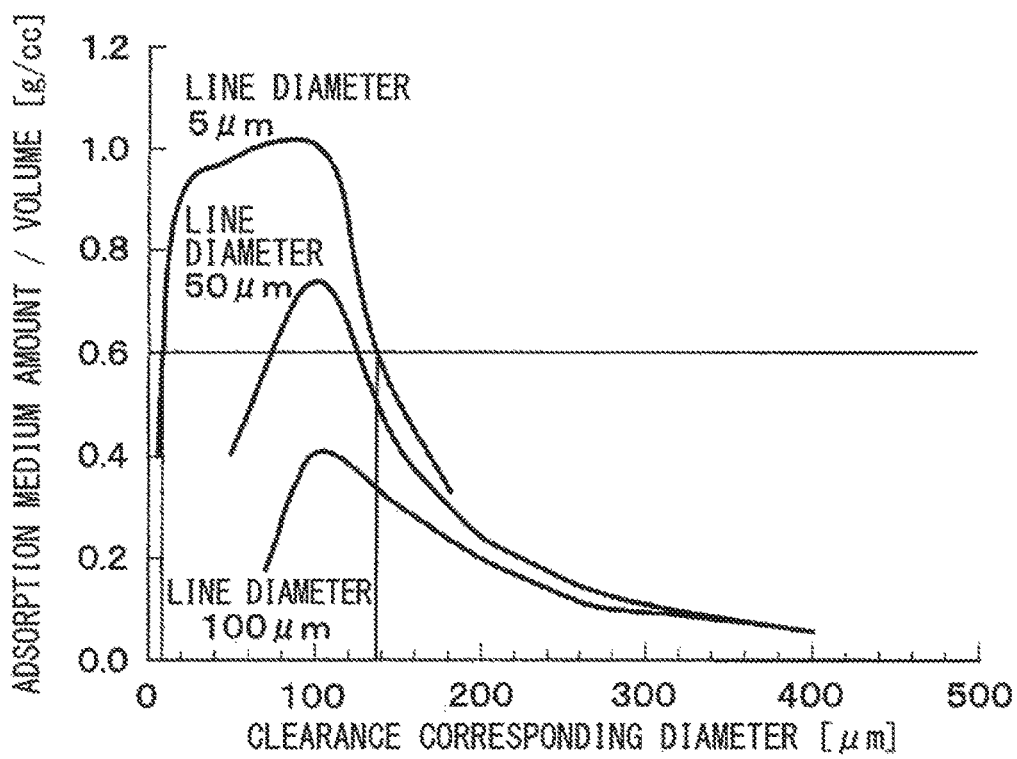
FIG. 11 is a graph to show a relationship between the clearance corresponding diameter and the adsorption medium amount in the heat transfer part of the evaporation/condensation part when vibrations are caused in the second embodiment.

In the second embodiment, an optimal range of a clearance of a porous body to construct the heat transfer parts 103b, 203b of the evaporation/condensation parts 103, 203 will be described on the basis of FIG. 10 and FIG. 11. In FIG. 10 and FIG. 11, a vertical axis denotes a holding amount of the adsorption medium per unit volume in each of the heat transfer parts 103b, 203b, whereas a horizontal axis denotes a clearance corresponding diameter. The clearance corresponding diameter of the porous body constructing each of the heat transfer parts 103b, 203b can be calculated by the following mathematical formula 1 by the use of a framework diameter (line diameter) and a porosity of each of the heat transfers 103b, 203b.

[Mathematical formula 1]

$$\text{Clearance corresponding diameter} = d \cdot \{3\pi/(4(1-\Phi)) - 1\} \quad (1)$$

where d is the line diameter (framework diameter) of the porous body and $\Phi$ is the porosity of the porous body.

An amount of the adsorption medium which can be held by each of the heat transfer parts 103b, 203b is determined by the balance of the weight of the adsorption medium held by each of the heat transfer parts 103b, 203b and a surface tension generated on the adsorption medium held by each of the heat transfer parts 103b, 203b. First, the clearance corresponding diameter of each of the heat transfer parts 103b, 203b is increased, the amount of the adsorption medium which can be held by each of the heat transfer parts 103b, 203b is also increased. On the other hand, when the clearance corresponding diameter of each of the heat transfer parts 103b, 203b becomes larger than a predetermined value, the gravity applied to the adsorption medium becomes larger than the surface tension, so that the adsorption medium drops from each of the heat transfer parts 103b, 203b. As a result, the holding amount of the adsorption medium in each of the heat transfer parts 103b, 203b decreases.

Further, even if the heat transfer parts 103b, 203b are equal to each other in the clearance corresponding diameter, as the heat transfer parts 103b, 203b become smaller in the line diameter (framework diameter), the amount of adsorption medium to be held by each of the heat transfer parts 103b, 203b increases. In the second embodiment, the line diameter of each of the heat transfer parts 103b, 203b is assumed to be three kinds of 5 µm, 50 µm, and 100 µm. A lower limit of the line diameter of the porous body which can be widely acquired is approximately 5 µm.

To enlarge the heat transfer area in which heat is exchanged between the adsorption medium and the heat exchanging medium in the heat transfer parts 103b, 203b and to improve the COP (cooling output/amount of heat required at the time of operation) of the adsorption type refrigerator, it is sufficient that the adsorption medium held per volume of 1 cm³ of each of the heat transfer parts 103b, 203b is not less than 0.6 g. The amount of the adsorption medium held in the clearance of each of the heat transfer parts 103b, 203b occupies 60% or more per unit volume of each of the heat transfer parts 103b, 203b.

As shown in FIG. 10, when the line diameter of the heat transfer parts 103b, 203b is 5 µm, the clearance corresponding diameter of the heat transfer parts 103b, 203b in which the adsorption medium held per volume of 1 cm³ of the heat transfer parts 103b, 203b is not less than 0.6 g ranges from 7 µm to 260 µm. Further, when the line diameter of the heat transfer parts 103b, 203b is 50 µm, the clearance corresponding diameter of the heat transfer parts 103b, 203b in which the adsorption medium held per volume of 1 cm³ of the heat transfer parts 103b, 203b is not less than 0.6 g ranges from 80 µm to 260 µm. Still further, when the line diameter of the heat transfer parts 103b, 203b is 100 µm, the clearance corresponding diameter of the heat transfer parts 103b, 203b in which the adsorption medium held per volume of 1 cm³ of the heat transfer parts 103b, 203b is not less than 0.6 g ranges from 140 µm to 260 µm.

To hold a sufficient amount of adsorption medium by the heat transfer parts 103b, 203b, the clearance corresponding diameter of the heat transfer parts 103b, 203b is recommended to range from 7 µm to 260 µm.

Further, under conditions where vibrations are caused, for example, the vehicle is running, a downward acceleration is caused. The gravity applied to the adsorption medium becomes large and hence to hold a sufficient amount of adsorption medium by the heat transfer parts 103b, 203b, an upper limit of a suitable clearance corresponding diameter of the heat transfer parts 103b, 203b becomes small.

FIG. 11 shows a relationship between the amount of the adsorption medium, which can be held by the heat transfer parts 103b, 203b, and the clearance corresponding diameter in a case where vibrations supposed when the vehicle is running on an ordinary road are caused. As shown in FIG. 11, when the line diameter of the heat transfer parts 103b, 203b is 5 µm, the clearance corresponding diameter of the heat transfer parts 103b, 203b in which the adsorption medium held per volume of 1 cm³ of the heat transfer parts 103b, 203b is not less than 0.6 g ranges from 7 µm to 140 µm. Further, when the line diameter of the heat transfer parts 103b, 203b is 50 µm, the clearance corresponding diameter of the heat transfer parts 103b, 203b in which the adsorption medium held per volume of 1 cm³ of the heat transfer parts 103b, 203b is not less than 0.6 g ranges from 80 µm to 130 µm.

When vibrations supposed when the vehicle is running on the ordinary road are caused, to hold a sufficient amount of adsorption medium by the heat transfer parts 103b, 203b, the clearance corresponding diameter of the heat transfer parts 103b, 203b may range from 7 µm to 140 µm.

According to the second embodiment described above, by making the clearance corresponding diameter of the heat transfer parts 103b, 203b range from 7 µm to 260 µm, the heat transfer parts 103b, 203b can hold the sufficient amount of adsorption medium. As a result, the heat transfer area in which heat is exchanged between the adsorption medium and the heat exchanging medium in the heat transfer parts 103b, 203b can be made large and hence the COP (cooling output/amount of heat required at the time of operation) of the adsorption type refrigerator can be improved.

Further, by making the clearance corresponding diameter of the heat transfer parts 103b, 203b range from 7 µm to 140 µm, even in a case where vibrations are caused when the vehicle is running, the heat transfer parts 103b, 203b can hold the sufficient amount of adsorption medium.

Third Embodiment

Next, a third embodiment will be described. In the third embodiment, the description of the same parts as in the first embodiment will be omitted and only different parts will be described.

Figure 12:
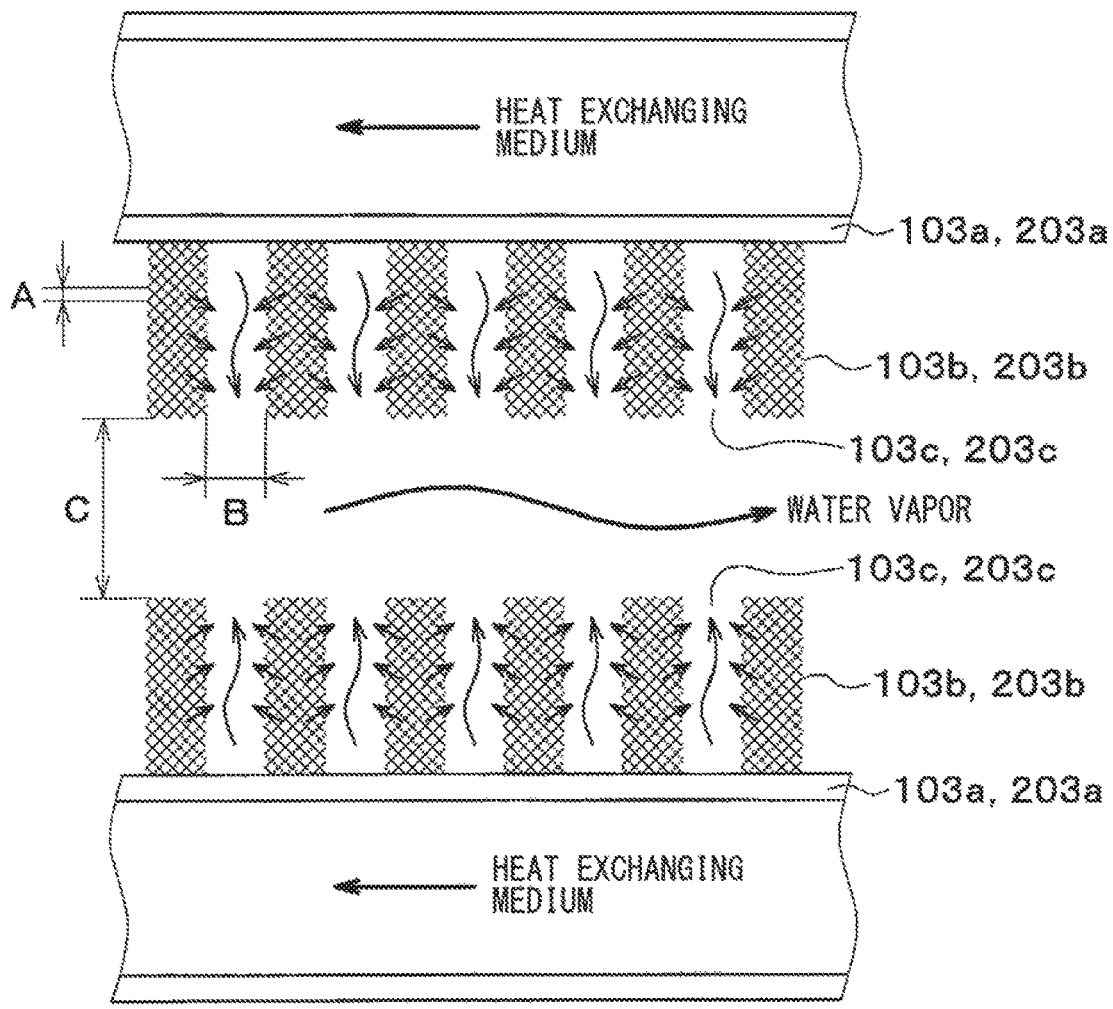
FIG. 12 is a schematic view to enlarge a part of an evaporation/condensation part of a third embodiment.
Figure 13:
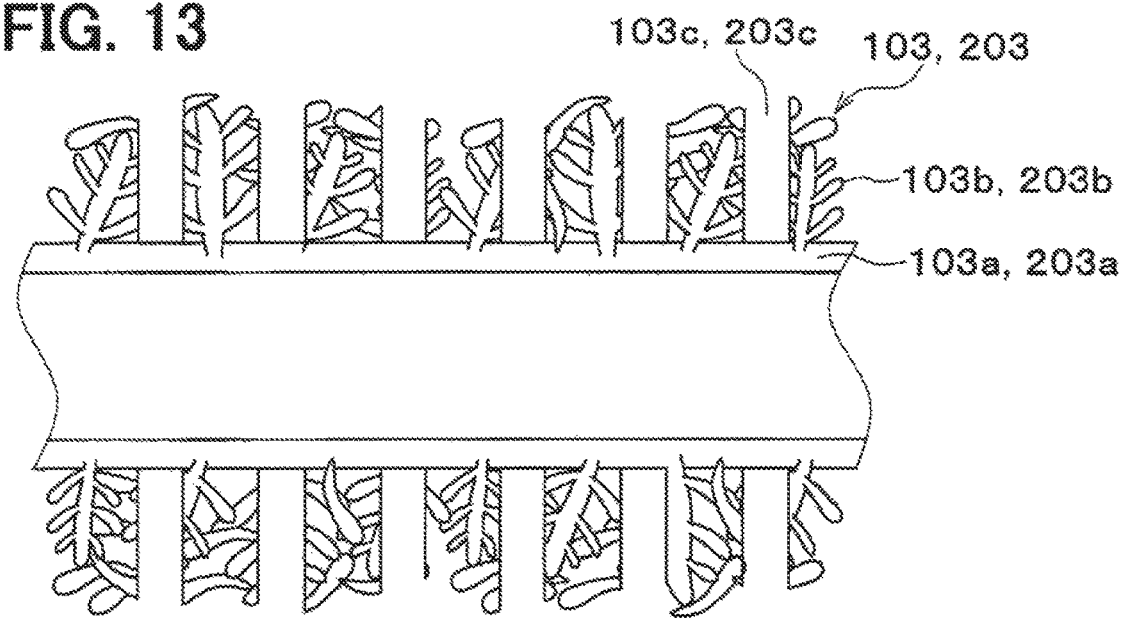
FIG. 13 is a schematic view to show a specific example of the evaporation/condensation part of the third embodiment.

As shown in FIG. 12, the heat transfer parts 103b, 103b which are respectively provided on the pipes 103a, 103a, which are adjacent to each other, are opposed to each other in a state where a gap of a predetermined space is provided between them. Similarly, the heat transfer parts 203b, 203b which are respectively provided in the pipes 203a, 203a, which are adjacent to each other, are opposed to each other in a state where a predetermined gap is provided between them. The heat transfer parts 103b of the third embodiment have a plurality of recesses 103c formed therein. Similarly, the heat transfer parts 203b of the third embodiment have a plurality of recesses 203c formed therein. Each of the recesses 103c is formed toward the pipes 103a from the surface of each of the heat transfer parts 103b. Similarly, each of the recesses 203c is formed toward the pipes 203a from the surface of each of the heat transfer parts 203b. In the third embodiment, each of the recesses 103c, 203c is formed as a cylindrical recess. Further, as shown in FIG. 13, the heat transfer parts 103b, 203b of the third embodiment are constructed of the sintered metal.

It is sufficient that a passage in which the adsorption medium changed to the vapor phase (that is, water vapor) flows efficiently is formed between the heat transfer parts 103b (203b) holding the adsorption medium and the outside of the evaporation/condensation parts 103 (203).

When the adsorption medium of the liquid phase, which is held by the heat transfer parts 103b (203b), is changed to the vapor phase, the adsorption medium passing through the clearances of the heat transfer parts 103b (203b) meets each other in the recess 103 (203c). Then, the adsorption medium passing through the plurality of recesses 103c (203c) meets each other in the gap between the heat transfer parts 103b (203b), which are adjacent to each other, and then is discharged to the outside of the evaporation/condensation part 103 (203). The amount of the adsorption medium passing through the heat transfer parts 103b (203b) increases in order of the clearances of the heat transfer part 103b (203b) (first passage)→the recess 103c (203c) (second passage)→the gap between the heat transfer parts 103b (203b), which are adjacent to each other (third passage).

In the third embodiment, when it is assumed that: a space of the clearance (the first passage) of the heat transfer part 103b (203b) which holds the adsorption medium is a first passage space A; a space of the second passage through which the adsorption medium passing through the first passage passes immediately after the first passage is a second passage space B; and a space of the third passage through which the adsorption medium passing through the second passage passes immediately after the second passage is a third passage space C, a relationship of the first passage space A<the second passage space B<the third passage space C is established.

By making the passage of the adsorption medium evaporated in the heat transfer parts 103b (203b) larger in order of the first passage space A, the second passage space B, and the third passage space C (that is, A<B<C), it is possible to reduce resistance when the adsorption medium passes through these passages as much as possible and hence to make the adsorption medium pass through these passages efficiently.

The embodiments have been described above and the present disclosure is not limited to these embodiments, but the preset disclosure extends to a range easily replaced by a person skilled in the art without being limited to the phrases described as far as the range does not deviate from the scope of the present disclosure. Further, modifications based on the knowledge usually obtained by the person skilled in the art can be appropriately added to the present disclosure. Modifications of the embodiments described above will be described below.

In the respective embodiments described above, the heat transfer parts 103b, 203b of the evaporation/condensation parts 103, 203 are constructed of the copper or the copper alloy but are not limited to these. They may be constructed of a different material such as aluminum and stainless steel.

Figure 14A:
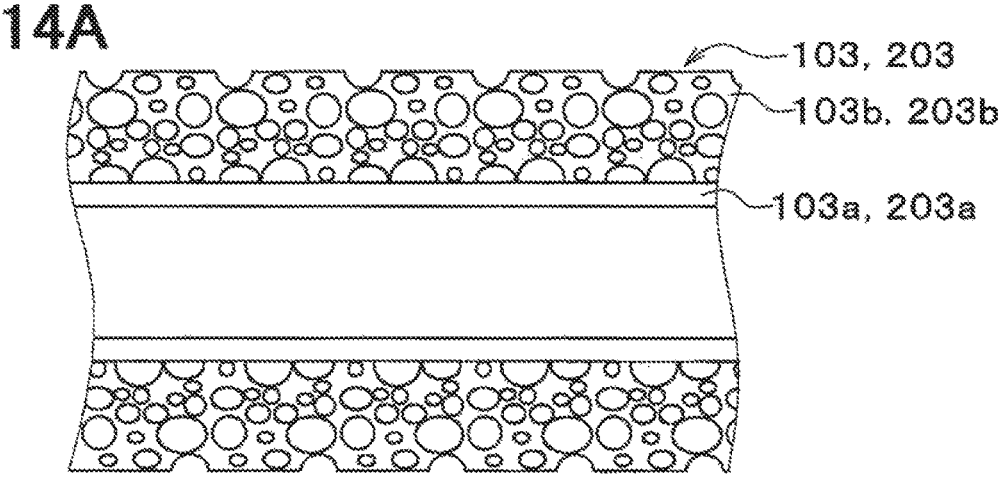
FIG. 14A is a schematic view showing a modification of an evaporation/condensation part and showing an example in which a heat transfer part is constructed of a foam metal.
Figure 14B:
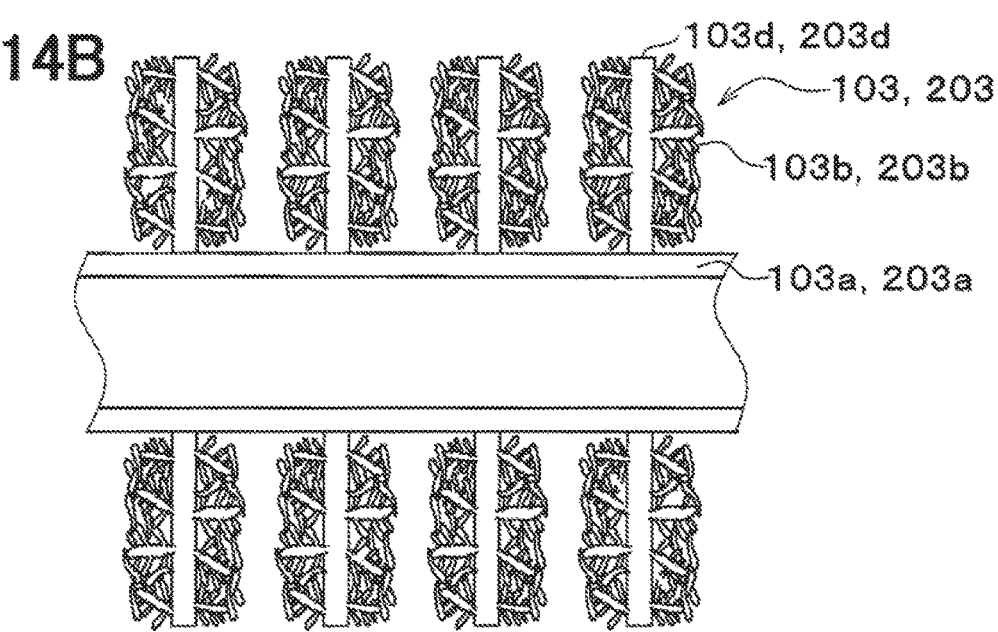
FIG. 14B is a schematic view showing a modification of an evaporation/condensation part and showing an example in which a fin is provided with a heat transfer member.
Figure 14C:
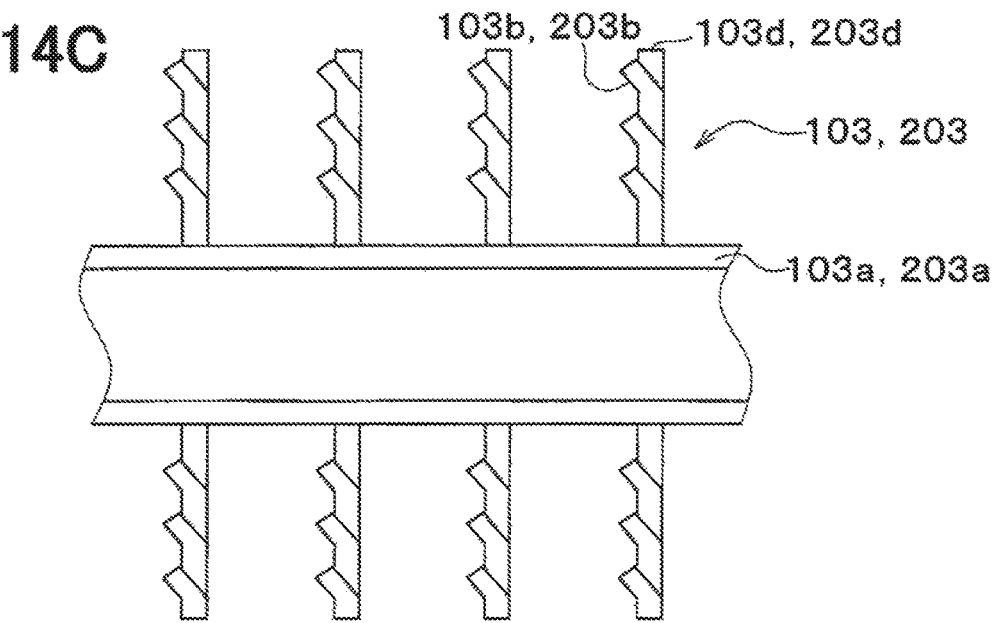
FIG. 14C is a schematic view showing a modification of an evaporation/condensation part and showing an example in which a heat transfer part is constructed as a cut and raised part.

In the first embodiment, the heat transfer parts 103b, 203b of the evaporation/condensation parts 103, 203 are constructed of the sintered metal, but it is sufficient that the heat transfer parts 103b, 203b can hold the adsorption medium, and the heat transfer parts 103b, 203b may be a mode different from the first embodiment. As shown in FIG. 14A, the heat transfer parts 103b, 203b may be constructed of a foam metal. Further, as shown in FIG. 14B, fins 103d (203d) may be provided on the periphery of each of the pipes 103a (203a) and heat transfer members 103b (203b) may be provided on each of the fins 103d (203d). Still further, as shown in FIG. 14C, the heat transfer member 103b (203b) may be constructed as cut and raised portions formed by cutting and raising the surface of the fin 103d (203d). Alternatively, the heat transfer member 103b (203b) may be constructed of alumina whose surface is uneven.

Figure 15:
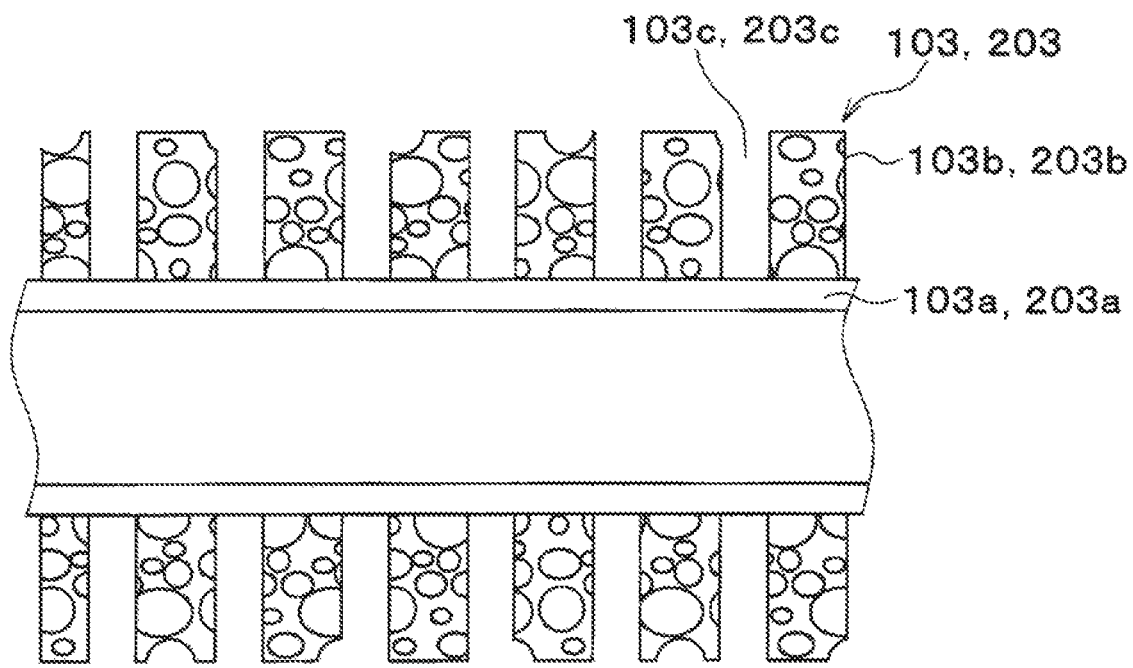
FIG. 15 is a schematic view to show a modification of an evaporation/condensation part.

In the third embodiment described above, the heat transfer parts 103b (203b) constructed of the sintered metal are provided with the recesses 103c (203c) but are not limited to this. As shown in FIG. 15, the heat transfer parts 103b (203b) constructed of the foam metal may be provided with the recesses 103c (203c).

Figure 16:
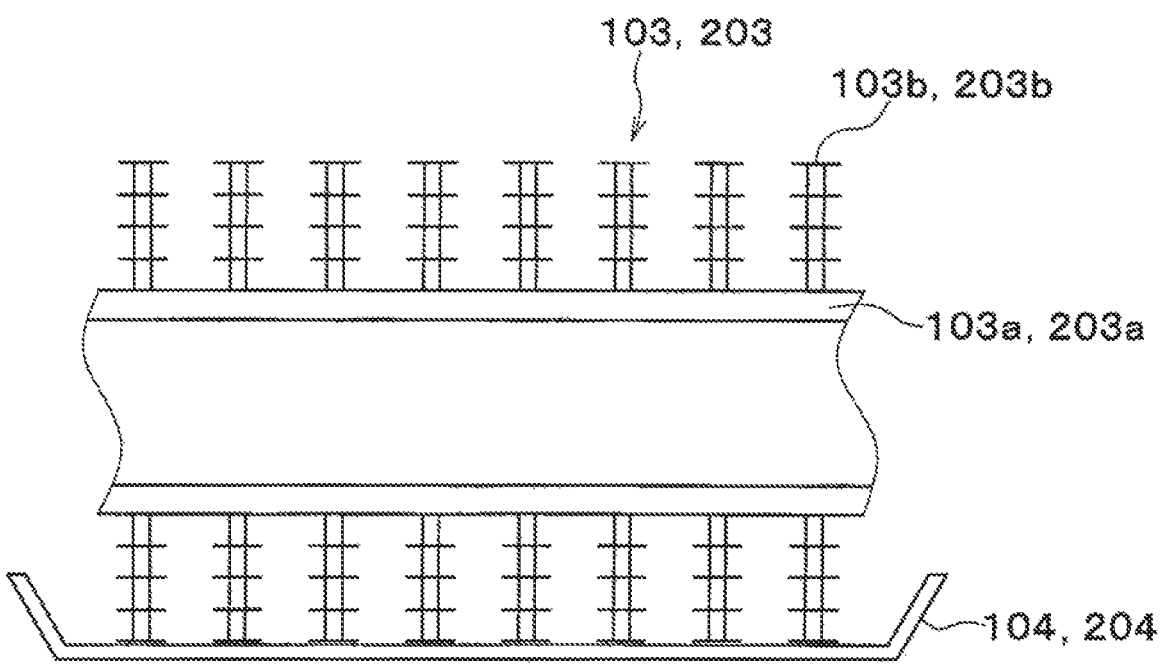
FIG. 16 is a schematic view to show a modification of an evaporation/condensation part.

In the construction of each of the embodiments described above, as shown in FIG. 16, a pan 104 (204) may be provided in such a way as to be in contact with the heat transfer parts 103b (203b) below the heat transfer parts 103b (203b) of the evaporation/condensation part 103 (203). It is sufficient that the pan 104 (204) can store the adsorption medium of the liquid phase. Even if the adsorption medium of the liquid phase, which is condensed in the heat transfer parts 103b (203b), is moved down by the gravity, the adsorption medium stored in the pan 104 (204) can be held by the heat transfer parts 103b (203b) in contact with the pan 104 (204). Hence, when the adsorption medium is evaporated, it is possible to prevent a state (dryout) in which the adsorption medium of the liquid phase does not exist around the heat transfer parts 103b (203b). Further, when a gap is formed between the heat transfer parts 103b (203b) provided at a lowermost position in the vertical direction of the evaporation/condensation part 103 (203) and the bottom surface of the closed container 101 (201), the pan 104 (204) may be provided below the heat transfer parts 103b (203b) provided at the lowermost position in the vertical direction of the evaporation/condensation part 103 (203) in such a way as to be in contact with the heat transfer parts 103b (203b).

Figure 17A:
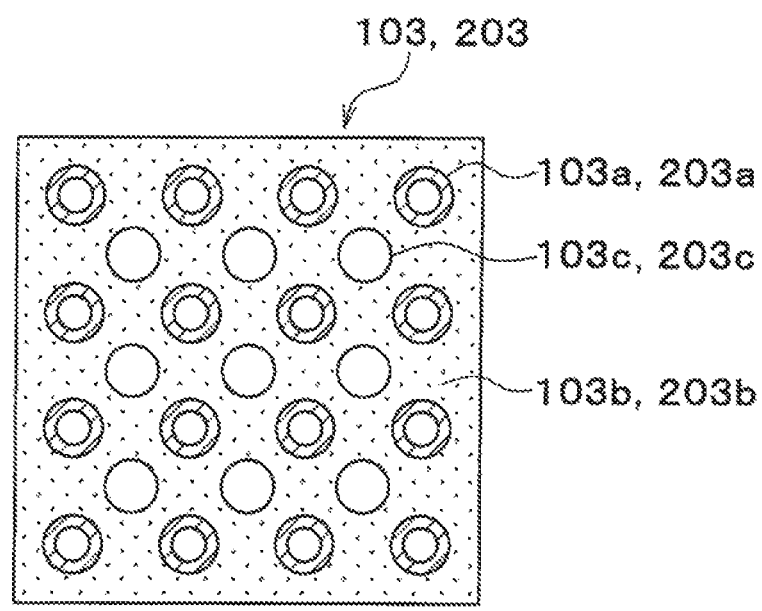
FIG. 17A is a schematic view showing a modification of an evaporation/condensation part and showing an example in which heat transfer parts formed on a plurality of pipes are integrally configured.
Figure 17B:
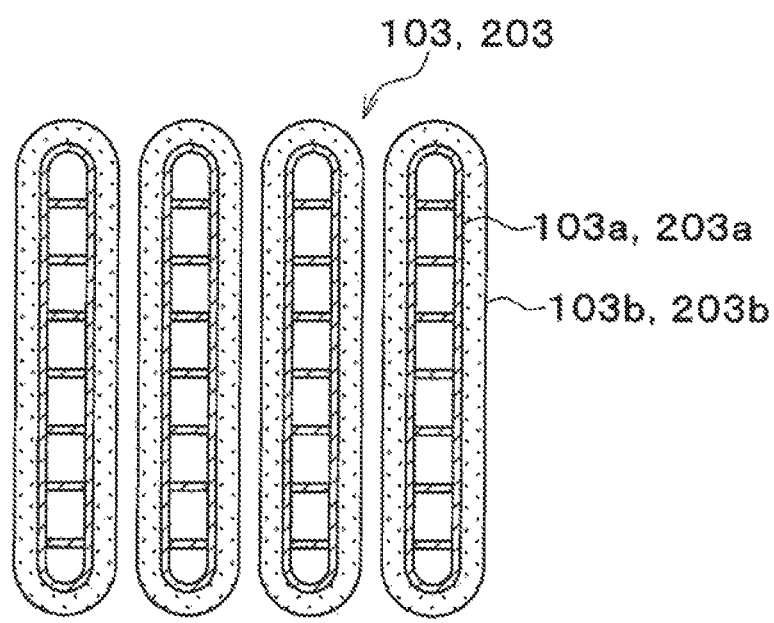
FIG. 17B is a schematic view showing a modification of an evaporation/condensation part and showing an example in which a heat transfer part is constructed around a multi-hole pipe.

Still further, each of the embodiments, as shown in FIG. 3, is constructed in such a way that each of the plurality of pipes 103a (203a) of the evaporation/condensation part 103 (203) is provided with the heat transfer parts 103b (203b) but may be constructed in a different mode. As shown in FIG. 17A, the heat transfer parts 103b (203b) which are provided on the plurality of pipes 103a (203a) may be integrally constructed. In this case, the adsorption medium is hard to be evaporated and condensed on an inner side remote from an outer peripheral portion in the heat transfer parts 103b (203b), so that through holes 103c (203c) to accelerate the evaporation and the condensation of the adsorption medium may be formed in the heat transfer parts 103b (203b). Further, as shown in FIG. 7B, the pipe 103a (203a) may be a multi-hole pipe which has a plurality of small passages formed therein and may have the heat transfer parts 103b (203b) formed around itself.

Still further, in the respective embodiments, the present disclosure is applied to the adsorption type refrigerator for the vehicle air conditioner but is not limited to this. The present disclosure may be applied to the adsorption type refrigerator for home use or for business use.

While the present disclosure has been described with reference to embodiments thereof, it is to be understood that the present disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An adsorber comprising:
a closed container in which an adsorption medium is included;
an adsorptioner that is provided in the closed container and includes an adsorbent, which adsorbs and desorbs the adsorption medium; and
an evaporator/condenser that is provided in the closed container and that exchanges heat between the adsorption medium and a heat exchanging medium, which is supplied from outside of the closed container, to evaporate and condense the adsorption medium, wherein:
the evaporator/condenser includes a heat transfer surface that transfers heat of the heat exchanging medium to the adsorption medium;
the heat transfer surface is capable of holding the adsorption medium, an amount of which is capable of being adsorbed by the adsorbent of the adsorptioner;
the heat transfer surface is a porous heat transfer body;
the porous heat transfer body is formed of a metal fiber; and
a clearance corresponding diameter of the heat transfer surface is within a range from 7 to 260 μm, and is expressed by a mathematical formula 1:

(clearance corresponding diameter)=$d \cdot \{3\pi/(4(1-\Phi))-1\}$, where:

d is a line diameter, which is a framework diameter of the porous heat transfer body; and
$\Phi$ is a porosity of the porous heat transfer body.

2. The adsorber according to claim 1, wherein the amount of the adsorption medium that the heat transfer surface is capable of holding is set to be equal to or smaller than a capacity of the adsorptioner to adsorb the adsorption medium.

3. The adsorber according to claim 1, wherein the heat transfer surface is made of sintered metal or foam metal.

4. The adsorber according to claim 1, wherein the adsorptioner includes a heat transfer surface for adsorption that is a porous body having the same configuration as the heat transfer surface of the evaporator/condenser, the adsorbent provided for the porous body.

5. The adsorber according to claim 1, wherein the clearance corresponding diameter of the heat transfer surface is within a range from 7 to 140 μm.

6. An adsorber comprising:
a closed container in which an adsorption medium is included;
an adsorptioner that is provided in the closed container and includes an adsorbent, which adsorbs and desorbs the adsorption medium; and
an evaporator/condenser that is provided in the closed container and that exchanges heat between the adsorption medium and a heat exchanging medium, which is supplied from outside of the closed container, to evaporate and condense the adsorption medium, wherein:
the evaporator/condenser includes a heat transfer surface that transfers heat of the heat exchanging medium to the adsorption medium;
the heat transfer surface is capable of holding the adsorption medium, an amount of which is capable of being adsorbed by the adsorbent of the adsorptioner;
the heat transfer surface is a porous heat transfer body, and a relationship of a first passage space<a second passage space<a third passage space is satisfied where:
the first passage space is a space of a first passage formed by a plurality of clearances formed in the heat transfer surface;
the second passage space is a space of a second passage, wherein the adsorption medium, which has flowed through the first passage, flows through the second passage immediately after the first passage; and
the third passage space is a space of a third passage, wherein the adsorption medium, which has flowed through the second passage, flows through the third passage immediately after the second passage.

7. The adsorber according to claim 1, wherein the heat transfer surface of the evaporator/condenser is in contact with a bottom surface of the closed container.

8. The adsorber according to claim 1, further comprising a pan that is provided vertically below the heat transfer surface of the evaporator/condenser to be in contact with the heat transfer surface.

9. The adsorber according to claim 1, wherein the porous heat transfer body is constructed of a sintered metal made by heating metal fibers and by bonding the metal fibers without melting them into a dendrite shape tangled together to form a void therebetween.

10. The adsorber according to claim 6, wherein each one of the plurality of clearances formed in the heat transfer surface is diamond shaped.

* * * * *